United States Patent Office 3,369,235
Patented Feb. 13, 1968

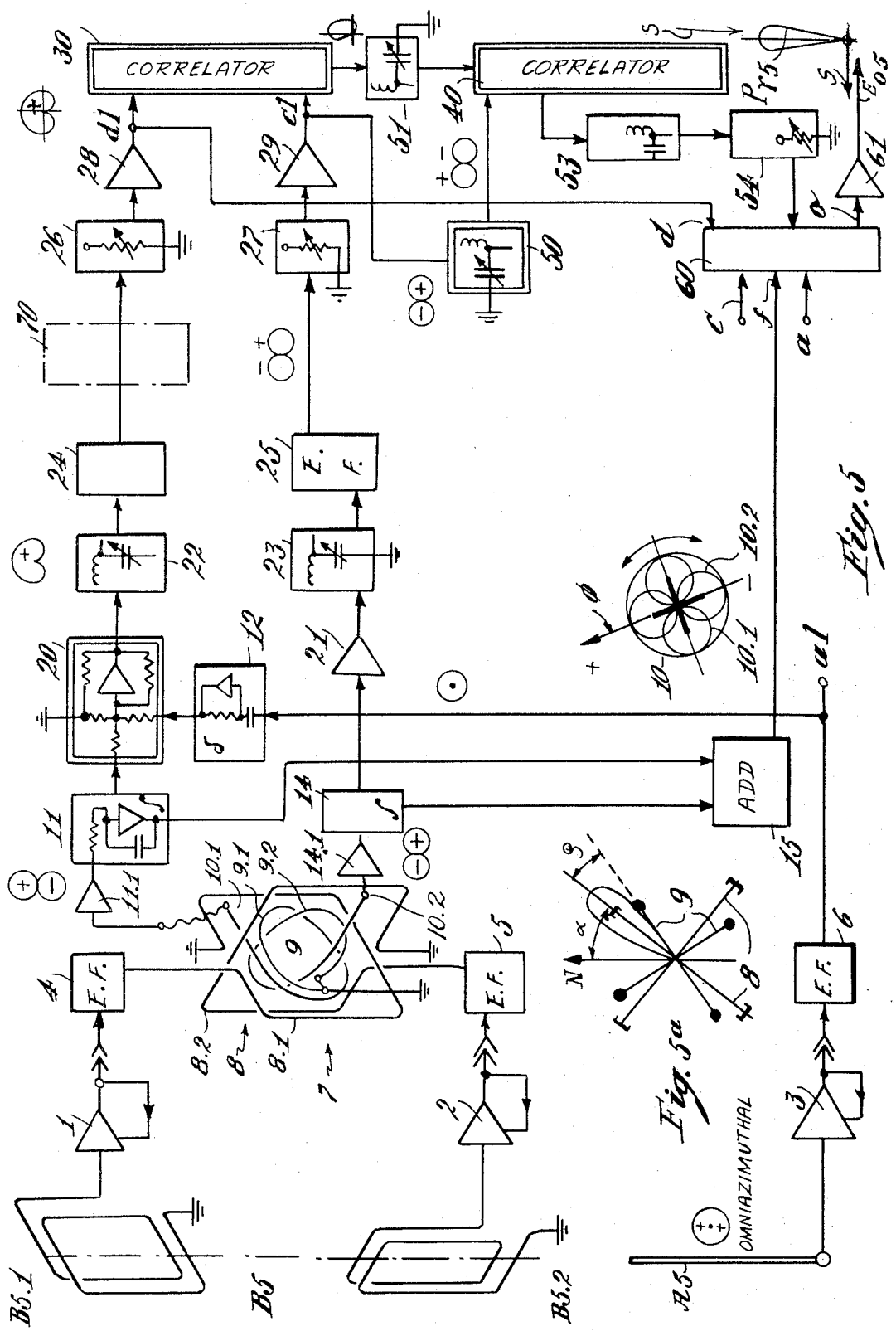

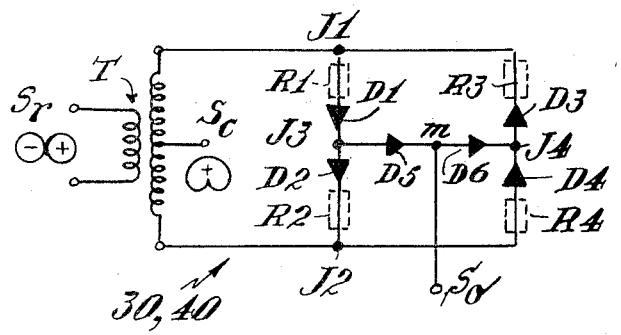
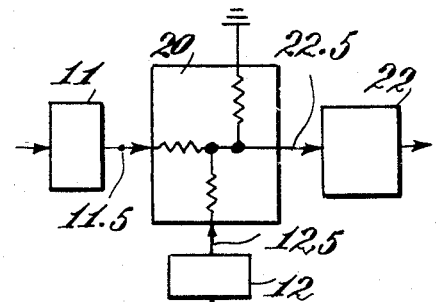
Fig. 7  Fig. 6
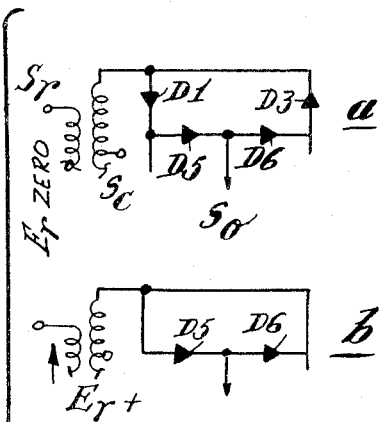
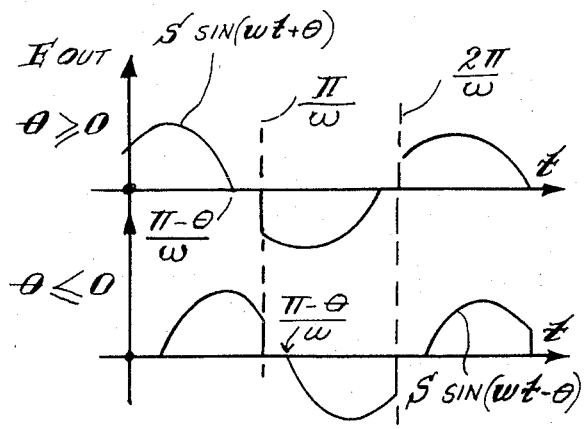
Fig. 9
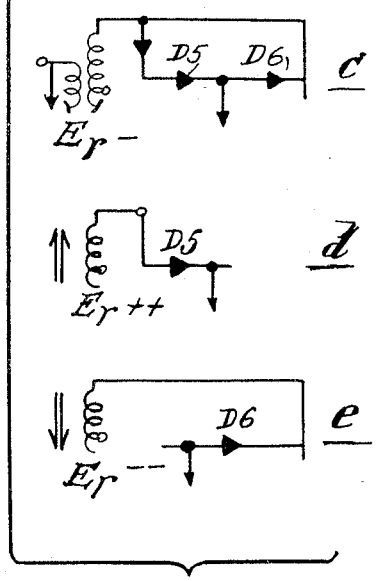
Fig. 8
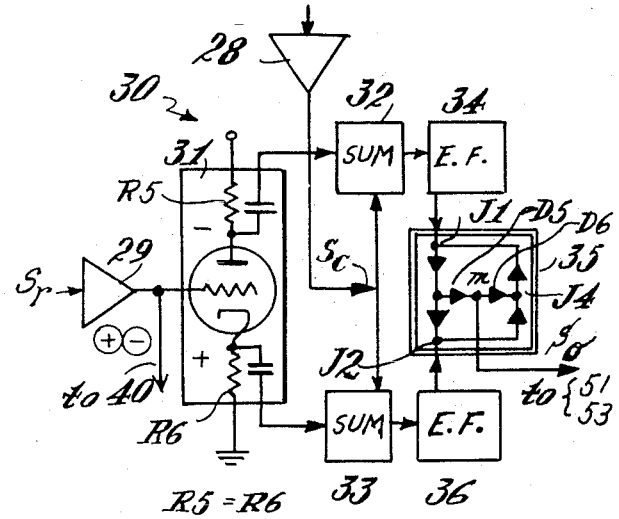
Fig. 10

3,369,235
DIRECTIONALLY SELECTIVE ENERGY RECEIVING SYSTEM
Charles E. Odams, North Reading, and Morton F. Spears, Westwood, Mass., assignors to Gorham Corporation, Providence, R.I., a corporation of Rhode Island
Filed Feb. 8, 1966, Ser. No. 525,970
23 Claims. (Cl. 343—100)

ABSTRACT OF THE DISCLOSURE

A directional radio receiver forms a narrow beam output signal from signals furnished by two antennas with dissimilar broad angle reception patterns (such as a whip antenna and a loop antenna) which are combined to eliminate from the broad angle reception patterns portions outside a predetermined narrow angle pattern, to the appreciable exclusion of energy including noise, impinging from without this narrow pattern. The combining of the reception patterns involves adding circuitry and bridge circuitry with four diodes connected at two opposite junctions to an impedance which is supplied with one antenna signal across its terminals and with the other antenna signal at a tap, the narrow beam output signal being derived from a terminal between two diodes connecting the two other bridge junctions. Interference rejection circuitry can be incorporated in the narrow beam reception circuitry. Several embodiments utilizing various antenna and intermediate reception patterns are described.

---

The field of the present invention is that of wave energy signal detectors or communication receivers which employ a plurality of energy collecting means and which combine several signals for the purpose of deriving therefrom a single output signal that conforms to requirements which none of the collectors by itself could fulfill.

It is often desirable to restrict signal reception to a direction selected within an omniazimuthal wave energy field including random noise as well as irrelevant communication signals which can be considered as part of the noise field. It is in such situations also desirable to select the direction of the signal to be received with considerable precision within an optimally small angle, to utilize diverse antenna reception patterns, and to receive with the same apparatus waves from very low to extremely high frequencies. For such purposes it has heretofore been necessary to use special antenna systems for each particular requirement. Such antenna systems are of mechanically complex or large and cumbersome and therefore expensive, construction. Also, they are often unreliable for their intended use because they are deficient in the elimination of noise as well as in easy training towards a selected wave energy sender, especially under conditions which involve considerable atmospheric, sender generated and receiver inserted noise.

Simple and lightweight antenna as well as circuitry construction, reception of low intensity broad band signals with appreciable directional selectivity, and reduction of signal to noise ratio are especially important for receivers in locations having limited facilities for antenna erection and manipulation, such as on aircraft or on board ships including submarines.

Objects of the present invention are to provide a wave energy receiving system which is with slight modifications usable for all practical frequencies, which is highly sensitive, which can be adapted to furnish various, especially very narrow angle receiving patterns, which can be easily trained in a selected receiving direction, and which appreciably reduces noise from all directions expecting the reception energy pattern which can be made as narrow as required for any practical purpose, such as in the order of 10° to the half power points— to provide such a system which requires only comparatively very simple and small energy collecting structures which can be trained towards a sender merely by way of the system circuitry, without bodily changing the antenna orientation;

to provide such a system which easily, conveniently and reliably permits the selection of various receiver output patterns;

to provide such a system which has optimal directivity, which permits, conveniently and without detriment to its output quality, reception over a very broad band such as from 8 kc. to 150 kc., which has maximal gain and signal strength, and which has an optimal signal to noise ratio;

to provide circuitry for reducing jamming hazards and for optimal noise exclusion even beyond the capability of the receiver circuitry proper;

to provide, generally speaking, a wave energy selecting and receiving system which, although especially well suited for the reception of very low frequency electromagnetic energy, is readily adaptable to sensing energy in many modes including for example acoustic, ultrasonic, light, infrared and heat wave energy, and also atomic and nucleonic particle energy, of any wave frequency or particle characteristic that can otherwise be practically manipulated; and to provide an electromagnetic wave reception system of the above type which is applicable to use, among others, in communication, radar, navigation, timing, direction finding, search and rescue, directional noise survey, two-way active sonar, and passive listening sonar.

The nature and substance of the invention will now be summarized.

For understanding this summary as well as the ensuing description it should be kept in mind that the amplitude of a signal wave at any given instant depends, among other parameters, on the polar coordinates (amplitudes and amplitude vector angles) of the reception power pattern of the signal wave collecting (such as antenna) system and the latter's spatial (mainly angular) relation to the sender pattern. For purposes of this invention, selected virtual reception patterns are derived by the system circuitry from actual collector (such as antenna) reception patterns, and these virtual patterns appear in such circuitry at intermediate as well as final output terminals. The instantaneous signal wave amplitudes and phases at given circuitry points contain and are expressed, so to speak as quasi patterns by, the polar coordinates of respective antenna power patterns and the latter's spatial orientation. In other words, signals defined as amplitude-time functions appearing within circuitry, and signals defined as power-space angle functions appearing as antenna reception patterns are correlated and represent each other under certain well-defined presumptions, and can be expressed in terms of either. Thus, signals within circuitry can be said to be patterned to conform to antenna reception patterns, and their quasi reception patterns can be electronically manipulated such as algebraically and vectorially combined. This concept must be kept in mind throughout the following presentation were it speaks of amplitudes as functions of time as well as of functions of space. Such intermingling of terms is permissible if the transfer function interdependence of the terms is kept in mind; it simplifies the explanations of the wave energy translations and correlations according to the invention, of the circuitry used for that purpose, and of the practical results obtained thereby.

It should also be understood that the terms "azimuthal" and "omniazimuthal" as herein used are not restricted to the terrestrial horizon and its zenith. While the practical embodiments herein described refer to antenna structures (such as whip antennas) with reception patterns that are defined by terrestrial azimuth angles, the principles of the invention and the structures based thereon apply equally well to antenna systems referred to any desirable polar coordinate plane, for example one normal to a horizontal plane. Similarly, any planes of polarization can be used if consistent with the reception system as a whole.

Generally speaking, and having the above relation of signal wave amplitudes and collector reception patterns in mind, the system according to the invention furnishes an output signal which simulates and is patterned to represent a narrow angle antenna reception beam, by combining the output signals of energy collecting means with significantly dissimilar broad angle reception patterns. The required output dissimilarity of the respective individual collectors is according to the invention defined, in terms of amplitude and vector angle patterns of their polar diagrams, as follows. One collector furnishes from a wave impinging in a given direction a wide angle patterned output of appreciable amplitude in a collector orientation of selected relation to the wave impinging direction. Another collector furnishes a wide angle, dissimilarly patterned output which has in the collector orientation an amplitude that is appreciably different from the output amplitudes at other angles of the collector output pattern of the other collector. For example, one antenna can have a circular pattern (such as a whip antenna) with appreciable amplitude reception in all directions, and the other can be a non-circular (such as a loop or dipole antenna) with minimal amplitude reception in a predeterminable orientation. According to the invention, such dissimilar collectors are combined with receiver circuitry adapted to form from two or more broad angle patterned collector inputs a narrow angle output signal pattern the amplitude of which is maximal in the predetermined orientation, to the appreciable exclusion of energy from other angles. This correlation is accomplished by combining the two or more broad angle patterned signals in such fashion that the regions outside a sender determined direction of one wide angle (including omniazimuthal) reception pattern are suppressed together with the noise incident therein, by proper amplitude and phase correlation thereof with a second directional wide angle reception pattern whose outer regions are likewise suppressed with the noise incident in these outer regions. In other words, circuitry is provided for combining the broad beam patterned signals such that the amplitudes outside the desired narrow reception pattern are significantly excluded.

In another aspect of the invention, a signal obtained from mechanically simple wide angle antenna systems (such as a whip antenna and a loop antenna) and representing a cardioid reception pattern carrying the communication intended to be received, is combined with one or more wide angle reference or control signals obtained from a wide angle antenna system (such as quadrature loops) for eliminating the border regions of the cardioid communication patterns, retaining as output signal only a signal conforming to the narrow beam central regions of both input patterns.

In a further aspect of the invention a double lobed or figure 8 pattern, directly obtained from a simple conventional antenna system is combined with a cardioid patterned control signal (preferably obtained from an omniazimuthal antenna and a loop antenna), for obtaining a somewhat unsymmetrical but comparatively narrow beam output signal; in order to obtain a more perfect output signal, the unsymmetrical output signal is further combined with a figure 8 control signal of proper phase relationship to the first mentioned figure 8 signal.

In an important aspect of the invention, novel signal combining means (herein also referred to for short in a non-mathematical sense as "correlation") is used for purposes of the invention, which is conceived for eliminating unwanted random and communication input signals in undesired, such as coincident, phase relation to a control signal of a certain predetermined pattern. In a preferred embodiment, rectifier bridge switching circuitry with diodes in each of the four branches and also in a connection between two opposite junctions is used, wherein the communication signal with noise and a reference signal are supplied in superimposition between the two remaining opposite junctions, whereas the output signal is derived from intermediate unsymmetrical impedance means between the first mentioned junctions.

In a further, subsidiary, aspect of the invention, an interference rejecting or nulling circuit is combined with the circuitry for combining cardioid and figure 8 patterned signals. This nulling circuit adds figure 8 signals of proper amplitude and phase to the cardioid signals fed to the combining circuitry in order to modify the reception pattern such that a null results in a desired direction, and unwanted signals (especially noise from the said direction) are thus rejected.

The above exemplified basic system of combining wide angle patterned (especially cardioid, and figure 8 patterned) circuitry signals lends itself to various embodiments, suited for various purposes. In one such modification, the output of a vertically polarized omniazimuthal (such as whip) antenna and a figure 8 output such as from a loop antenna are combined to form two cardioid patterned signals of opposite phase; these are then further combined in a correlator (preferably of the above switching bridge type) such as to suppress the side region energy, obtaining the desired narrow angled final output. In another modification, an omniazimuthal antenna output such as of a whip antenna is combined with a phase omniazimuthal output such as of a crossed loop antenna to obtain a cardioid patterned signal which is then phase reversed and combined, as in the first-mentioned embodiment, with the omniazimuthal (whip) signal to obtain a narrow angle final output beam.

While some of the above characterized embodiments can be conceived as "series correlator" series, still other embodiments of the invention can be termed "parallel correlator" systems. In such systems, two correlators are connected to a circuitry point carrying a cardioid patterned signal and these correlators receive figure 8 control signals of opposite phase; the correlator outputs are unsymmetric beams of intermediate pattern angle with right and left-hand symmetry relatively to each other; these are added to furnish a symmetrical pattern with a high energy narrow angle central beam and wide side lobes. Finally, the symmetrical side lobe beam is combined with negative phase cardioid pattern in an adder, that provides a narrow angle patterned final output signal.

These and other objects and advantages, and aspects of novelty of the invention will appear from the following description of its principles and mode of operation and of several illustrative practical embodiments.

The description refers to drawings in which:

FIG. 5 is a block diagram of a specific embodiment according to the invention, incorporating the system of FIG. 4;

3,369,235

5

Figure 4:
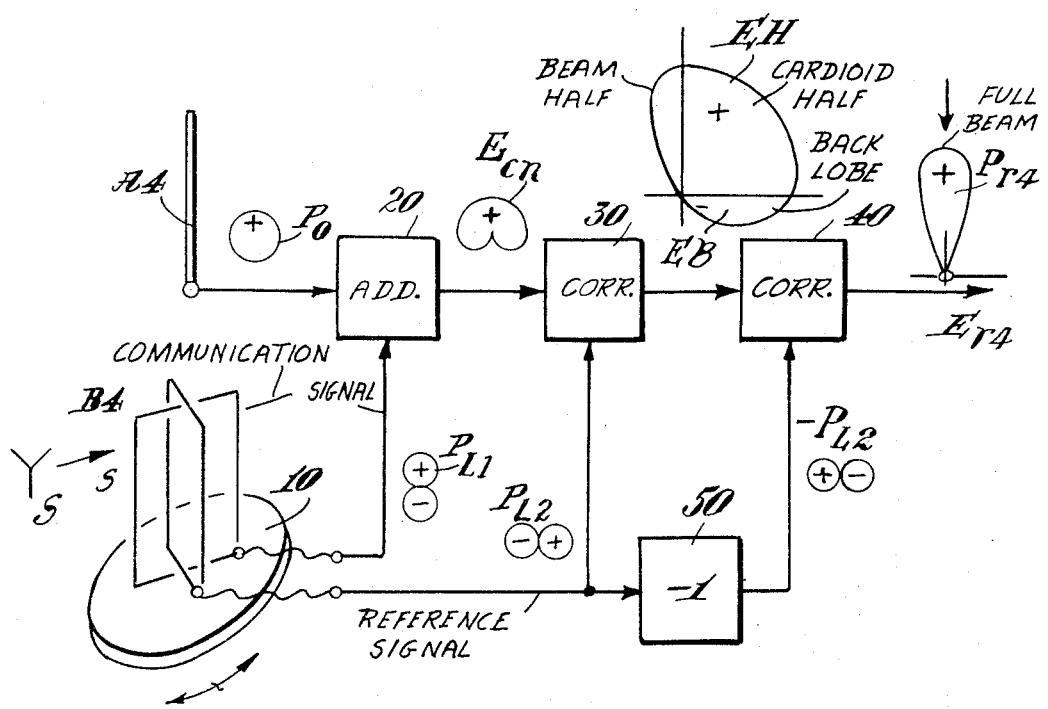
FIG. 4 is a diagram of a receiving system according to the invention wherein specifically selected antenna patterns are utilized for producing a narrow angle steerable receiver output signal.
Figure 11:
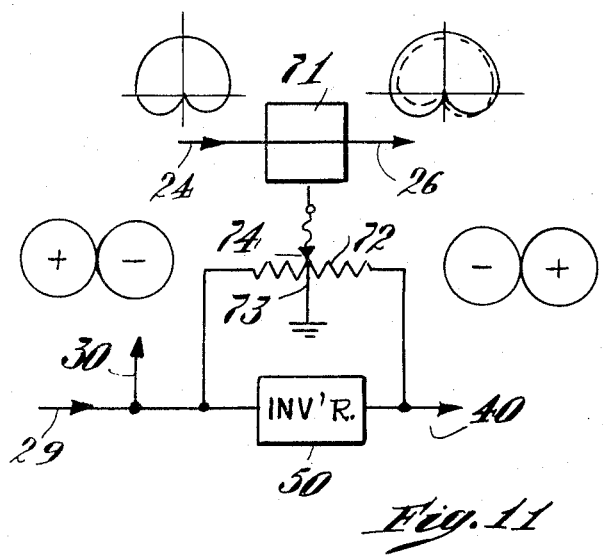
Figure 12:
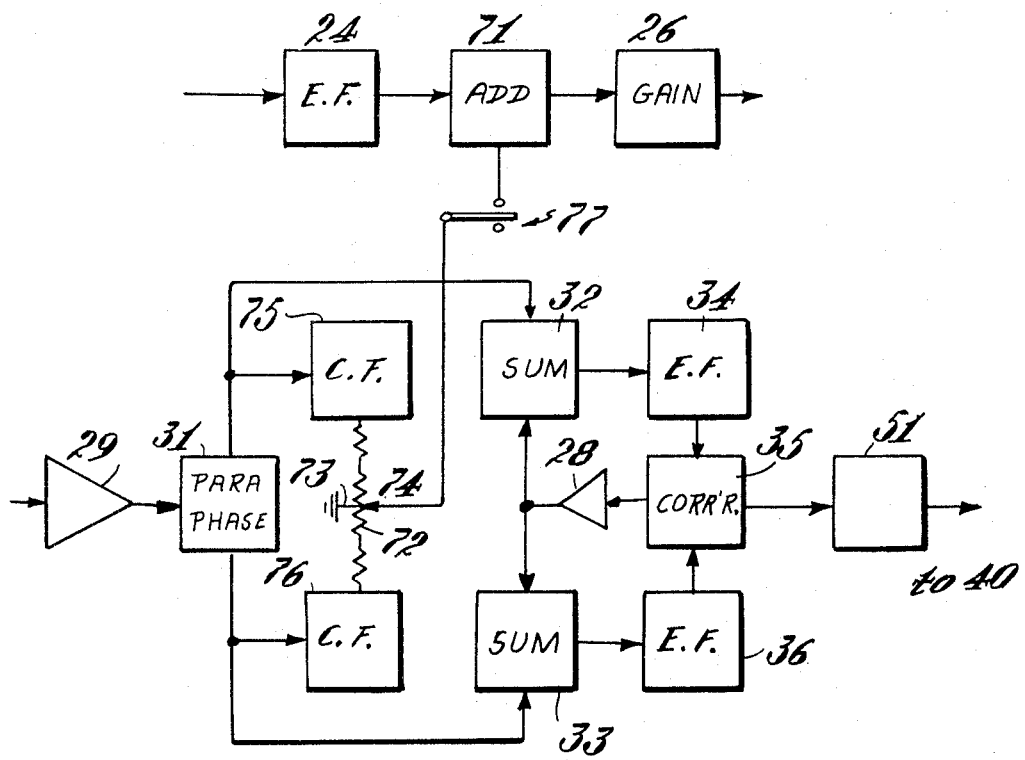
Figure 13:
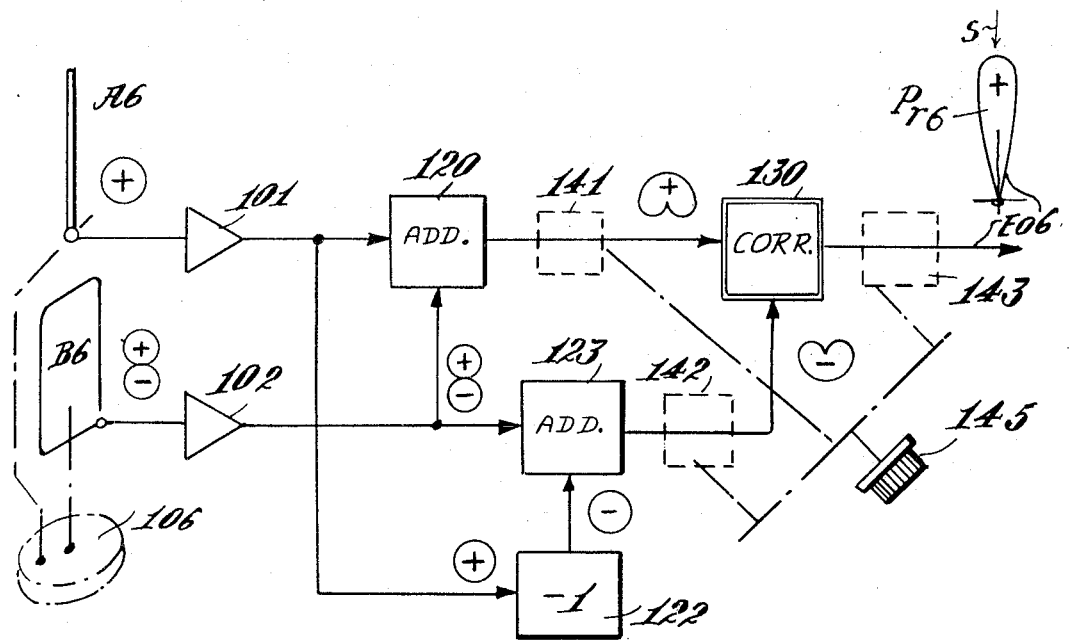
Figure 14:
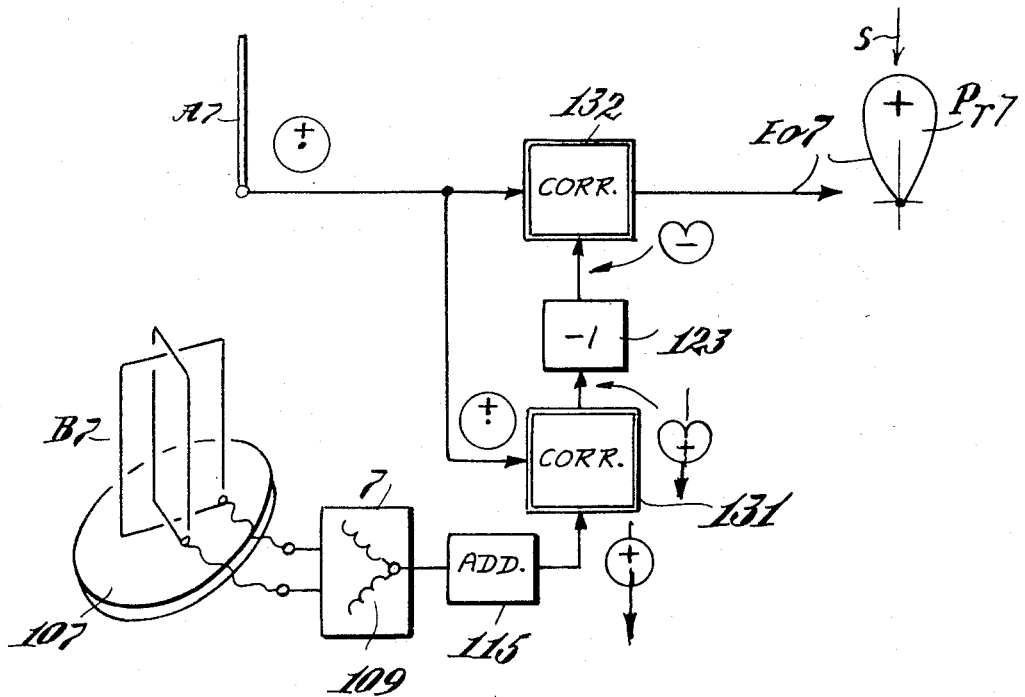
Figure 15:
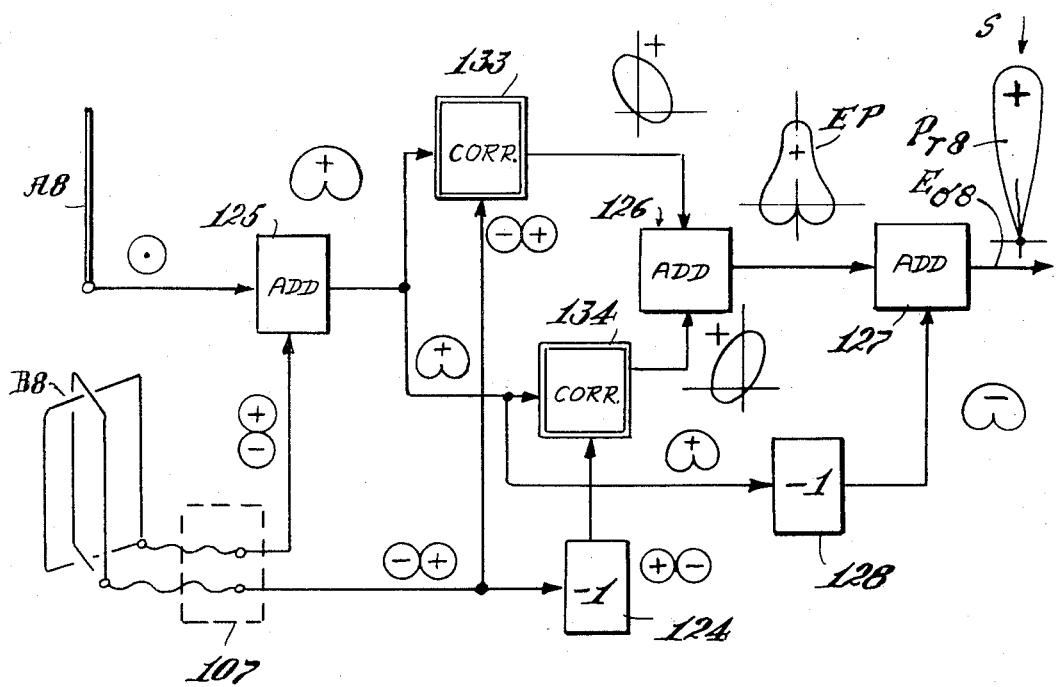

FIG. 5a is a diagram relating the crossed loop antenna and the resolver of FIG. 5 to each other;

FIG. 6 is a diagram of the summing circuit incorporated in FIG. 5;

FIG. 7 is a diagram of a correlator circuit according to the invention, as incorporated in the system according to FIGS. 4 and 5;

FIG. 8 is a series of circuit diagrams derived from FIG. 7, illustrating the operation of that circuit;

FIG. 9 is a diagram illustrating the operation of correlator circuitry according to FIGS. 7 and 8;

FIG. 10 is a diagram of the correlator circuit according to FIG. 7 as incorporated in the system according to FIG. 5;

FIG. 11 is the simplified circuit diagram of interference rejecting circuitry which can advantageously but need not be incorporated in systems according to the invention;

FIG. 12 is the diagram of a rejector according to FIG. 11, as incorporated in a system according to FIG. 5;

FIGS. 13, 14 and 15 are embodiments of the invention based on the principles and construction explained and described with reference to FIGS. 1 to 10.

Figure 1:
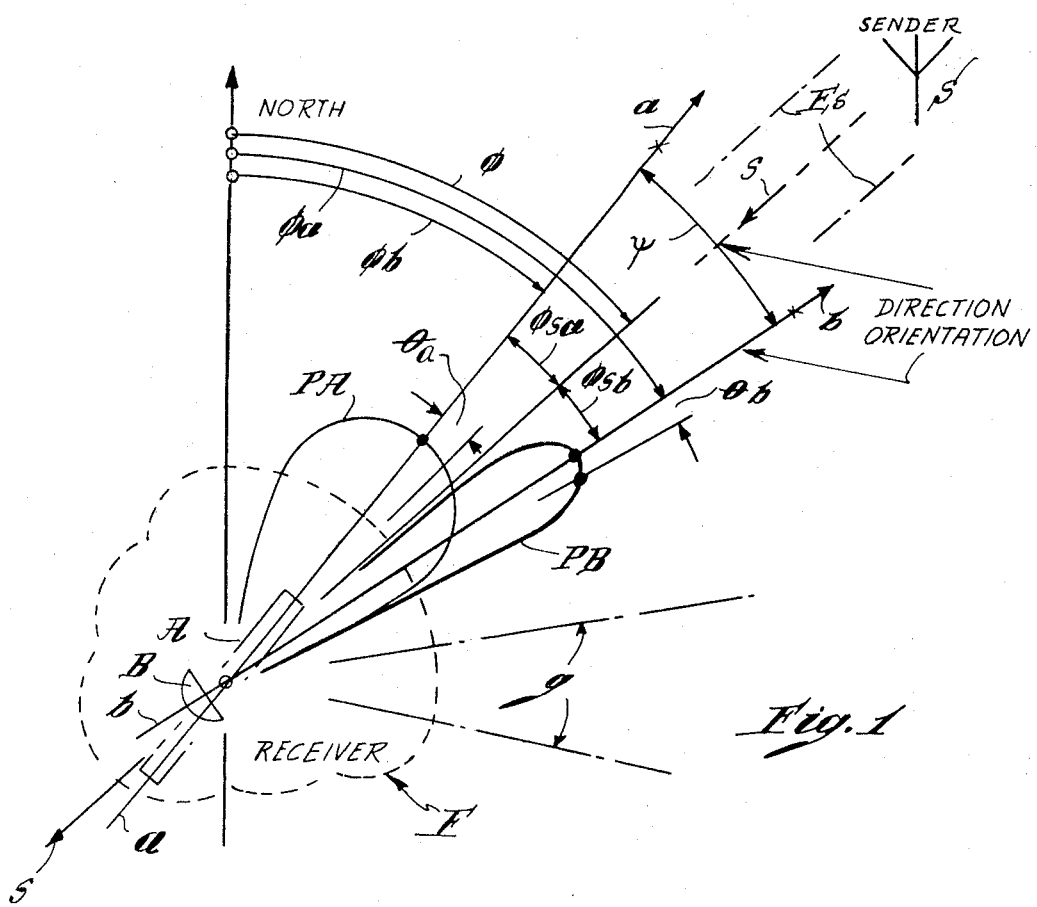
FIG. 1 is an azimuth diagram of antennas in a wave energy field, explanatory of the terminology herein used.

In FIG. 1 the dotted contour F indicates a general wave energy field including space noise as well as communication signals which are not desired to be received, such as indicated by dot and dash lines g, generally denoting some reception pattern. A signal carrying a communication to be received is indicated at $E_s$ and the direction in which this signal comes from a sending station S is indicated by arrow s.

An antenna system A, B is assumed to be appropriately oriented for optimal reception of the signal $E_s$ from the direction s in which the sender S is located. As indicated by the different configuration of symbols A, B, the antennas are usually, although not necessarily, of different construction, and have different reception patterns PA, PB, respectively. The angle between the receiving direction s and a geographical fixation line such as "north" (FIG. 1) is herein referred to as $\phi$. As also indicated, the optimal aiming orientations a, b of the patterns PA, PB of antennas A, B, respectively, do not necessarily coincide with the sender direction s, but are defined by angles $\phi_a$, $\phi_b$ with "North." The angle between a and b is $\psi$. Within each reception pattern, the polar coordinate phase angles are indicated as $\theta$; here for example the angles within PA and PB are designated $\theta_a$ and $\theta_b$. The orientations a and b subtend angles $\phi_{sa}$ and $\phi_{sb}$ with s. In this context, the above set forth explanation of the correlation between instantaneous signal amplitude and the spatial pattern of incident wave energy (herein expressed by the phase angle $\theta$ which again depends on orientation or aiming angle $\phi$) should be kept in mind. Needless to say, for omniazimuthal energy collectors such as vertical whip antennas, the angles $\theta$ as well as $\phi$ are irrelevant. If a directional collector is exactly trained or aimed in direction s, $\psi$ is zero and only $\phi$ angles come into consideration.

Figure 2:
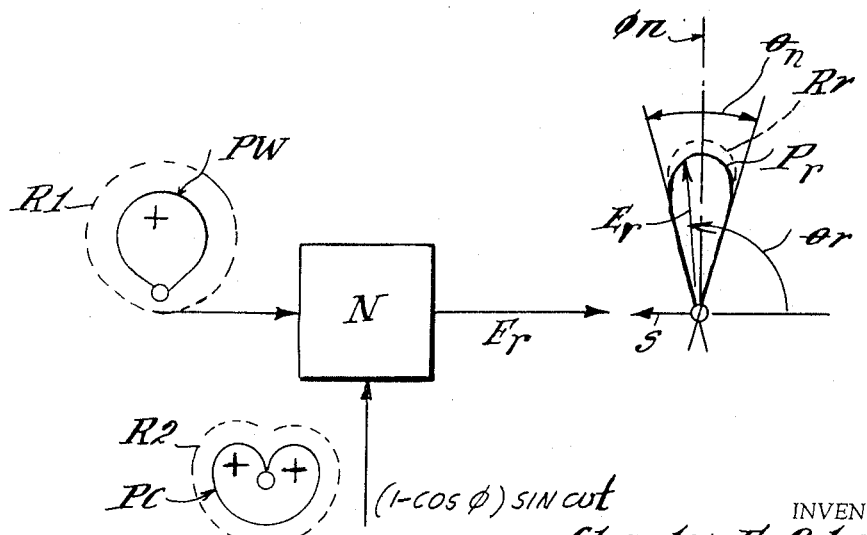
FIG. 2 is a schematic diagram illustrating the method according to the broad concept of the invention.

Referring now to FIG. 2, it is assumed that there are available, for a receiver according to the invention, two components of one and the same incoming signal energy train, originating from two different antennas of patterns PW, PC, respectively. Generally speaking, the two signals from appropriately aimed antennas are of dissimilar wide angle pattern, one antenna furnishing a definite signal pattern of appreciable amplitude in the aiming direction, whereas the other antenna has in that direction a signal of minimal magnitude. For example, one signal can be a broad loop beam and the other a cardioid or figure 8 shaped with a zero point in known phase with the pattern of the first antenna. Various types of antenna configurations are available for the present purpose. For example pattern PW can be supplied by a conventional dipole antenna, and the cardioid pattern PC by a conventional vertical wire and loop combination such as used in sense determination radio compass

6 systems. Assuming that both distribution patterns (actual antenna patterns or virtual patterns if circuitry affected) have a zero point and that the two signals are in proper phase relation the signal amplitudes which conform to the respective patterns can be combined in a correlator N (such as will be described in detail herein below) in such a manner that a virtual pattern $P_r$ of very small angle $\theta_n$ of directional energy distribution will result as final receiver output $E_r$ conforming to a polar pattern $E_r$, $\theta_r$. Thus, a narrow directional receiving range is selected by combining two broad beam patterned antenna signals. As indicated in FIG. 2, one antenna is usually omniazimuthal whereas the other antenna is definitely directional and furnishes a reference signal which determines the angle $\theta_n$ of the final signal. In FIG. 2 the dotted lines R1, R2 indicate random signals, and all these random signals excepting those arriving within the directional pattern angle $\theta_n$ are practically eliminated. Thus, impulse noise occurring from directions outside the desired reception beam (such as g of FIG. 1) does not obscure the desired signal as is the case for other antenna systems. In other words no noise peaks occur on top of the received signal unless they are received from the direction of the signal source and only such peaks are able to pass through the circuit. If several noise bursts are received simultaneously, the final receiver output signal $E_r$, combined from PW and PC will not necessarily have a 180° phase relation to PC, the directional reference signal, and complete noise cancellation will not occur. However it has been found that most noise bursts occur with moderate signal noise ratios, are from a single direction, and can be canceled out satisfactory in practical circuits. The quality of the final output will necessarily depend on that of the original and derived component signal patterns, but under near ideal conditions a virtual output signal pattern of about 10° between half power points results. The ideal reference signal is about 10 times the amplitude of the maximum primary cardioid communication signal. The leakage from the reference signal is about —60 db which limits the back and side lobe reception to about —40 db. The antenna system furnishing PW, PC can be mounted on the ground, or affixed to a movable object such as a ship or submarine, so long as it is possible to aim at the sender, or to aim one of them if the other is omniazimuthal.

With systems of this type it was possible to receive signals within a very broad band of carrier frequency, with noise elimination in every directional region excepting that within the narrow directional receiving range $\theta_n$, as indicated by $P_r$. As will appear from the modifications to be described herein below in addition to the principal embodiment according to FIG. 5, the choice of spatial distribution patterns of original antenna output as well as formed within the receiver circuitry, is very wide and flexible (such as wide angle, single lobe, figure 8, or double figure 8, or propeller), so long as the above explained main principle of the invention is adhered to, namely to establish amplitude and phase relation of combined distribution patterns such that negative pattern amplitudes cancel positive amplitudes outside of the desired small pattern angle $\theta_n$.

In order to indicate the, mainly 180°, phase relations of the various correlated directional patterns, they are herein referred to a horizontal zero line, and the 180° phase displacement is indicated by plus and minus symbols.

Figure 3:
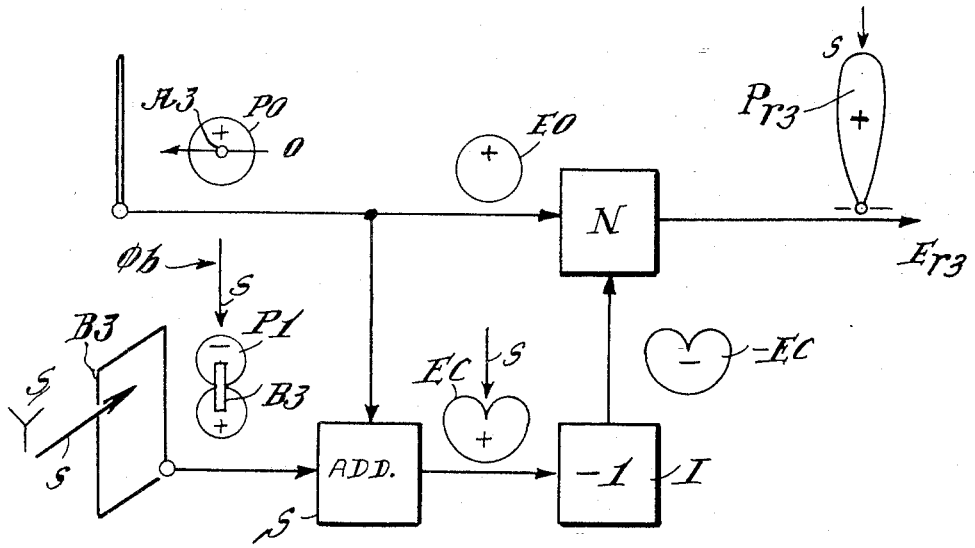
FIG. 3 is a diagram illustrating apparatus systems for carrying out the concept represented in FIG. 2.

FIGS. 3 and 4 further illustrate the general concept of the invention with reference to preferred specific wave energy collecting systems and reception patterns, original as well as circuitry derived.

In FIG. 3, the dissimilar antenna structures are by way of example, an omniazimuthal whip antenna A3 and a conventional loop antenna B3 which can be aimed at the sender in direction s. The respective spatial energy distribution patterns to which these antennas respond are indicated at P0 and P1. The respective noise and random signal reception patterns are similar to those indicated in dotted lines in FIGS. 1 and 2. It will be evident that the input signal amplitude conforming to P0 will not be affected by the geographical location of the sender, so long as the wire antenna is perpendicular to the azimuth plane of the angular distribution patterns. On the other hand, the input signal amplitude conforming to P1 will be optimal as to magnitude and quality of reception, only if the angle $\phi b$ (compare FIG. 1) is trained for optimal reception. In this case, the phase relationship between the two signals will be either in-phase, or, as here indicated, in quadrature. The two signals are first combined in conventional summating circuitry indicated at S which furnishes a cardioid patterned signal EC. The phase relations of the amplitude-angle (antenna) as well as amplitude-time (circuitry) patterns are indicated by the plus and minus symbols applied thereto, and in this context it will be understood that the singular points of the figure 8 and cardioid pattenrs and the center of the circular whip antenna patterns represent zero amplitude values. The cardioid signal EC is by means of a phase inverter I transformed into a cardioid signal $-$EC. A correlator N combines the circular patterned signal EO with the cardioid signal which results in an output signal $E_r3$ conforming to a narrow beam reception pattern $P_r3$ representing a selected narrow directional receiving range which, as explained above, excludes all noise and extraneous signals outside of the narrow beam angle. As distinct from the comparatively simple summing function of the component S, the correlator N is required to reject all received signals which do not conform to a particular ratio between the loop reception pattern and the whip reception pattern or between any patterns serving the same purposes as for example a broad beam pattern and a cardioid pattern according to FIG. 2. For example when the amplitude and the phase of the figure 8 signal P1 matches the amplitude and phase of the whip signal P0, a correlator output should result which conforms to a small angle beam pattern; all other signal components must be rejected. This purpose can be accomplished with the aid of multiplying and dividing circuitry, but at the present time, a synchronous switching circuit or phase detector type circuit is preferred which will be described in detail herein below with reference to FIGS. 7 to 9.

As will appear herein below in the description of various modifications of the typical practical embodiment herein primarily disclosed the invention is not restricted to the use of whip and loop antennas in combination with its noise restricting and reception pattern selecting circuitry. For example, instead of a loop antenna or two crossed loop antennas, one or two narrow beam parabolic antennas can be used, and instead of a whip wide angle parabolic antennas can be used.

With reference to FIG. 4, the principal features of a preferred embodiment of the invention will now be described.

In FIG. 4, A4 is a conventional whip antenna mounted perpendicularly to the azimuthal plane to which the angular distribution patterns are referred. The whip antenna A4 furnishes a primary antenna output conforming to the circular pattern P0. B4 denotes a system of loop antennas crossed at right angles in conventional fashion. These are in FIG. 4 indicated as rotatable on a platform 10, for the purpose of aiming at a sender, but they can be fixed as will be described below. In either case each of them furnishes a primary output of two figure 8 patterns, 90° displaced in phase, as indicated at $P_{L1}$, $P_{L2}$ respectively. It should be noted that rotatable crossed loops can be used to supply a phase steerable practically omniazimuthal antenna output which is useful for purposes of certain modifications of the present invention, which will be described herein below.

The output $P_0$ of the whip antenna and the reference output $P_{L1}$ of one loop are supplied to a summer 20 wherein they are combined to furnish a cardioid patterned signal $E_{Cn}$ of mainly positive phase. The phase relations of the signals are indicated as in FIG. 3.

The cardioid signal $E_{Cn}$ and the quadrature output $P_{L2}$ of the second loop are fed into a correlator 30 similar to N of FIG. 3, in the phase relation indicated in FIG. 4.

In the correlator 30, the cardioid patterned communication or primary signal $E_{Cn}$ is combined with the figure 8 reference signal $P_{L2}$, the null line of which is in the direction of the maximum of the cardioid. If the cardioid is of the plus phase type, all signals conforming to the direction of the negative phase half of the figure 8 are eliminated. Conversely, if the cardioid is a minus phase type all signals conforming to the plus phase half of the figure 8 will be eliminated. Signals conforming to the null point direction of the figure 8 are not affected because there is no reference signal in that direction. The output signal of 30 thus conforms to half of the receiving pattern for directions to the left of the sender direction, in the shape of a beam. The remaining half retains conformity of the cardioid pattern of the communication input signal $E_{Cn}$, because the figure 8 reference signal is exactly in phase with the cardioid communication signal input for reception from bearings to the right to the sender direction. Thus the output signal EH of 30 conforms to a half-beam half-cardioid pattern. The correlator operation will be further explained with reference to FIGS. 7 to 9.

The output signal EH of the correlator 30 has a fairly small pattern angle but is somewhat unsymmetrical. It can be used for some purposes and eliminates a good deal of noise providing at the same time better directional selectivity than any of the primary antenna structures of constructions simple enough to serve the objects of the present invention as initially stated. Also, the pattern EH can be easily further improved as follows.

The communication signal EH and a reference signal $-P_{L2}$, obtained by reversing the phase of $P_{L2}$ in a phase inverter 50 (which has a function similar to that of component I in FIG. 3), are fed into a second correlator 40. It will be apparent that the signal $-P_{L2}$ so far as the pattern is concerned, has the same effect on the cardioid half of EH as $P_{L2}$ has on the full cardioid $E_{Cn}$, in correlator 30. All signals conforming to the plus phase direction of the original figure 8 pattern will be eliminated, and the only signals left will be those coming in the null direction of $-P_{L2}$ and the positive maximum direction of the cardioid; a signal $P_{r4}$ patterned conforming to the beam $E_{r4}$ will result which is not only symmetrical but narrower than EH.

The generation of a communication output signal $E_{r4}$ conforming to a useful small angle beam pattern depends on achieving reasonably perfect null coordinates in the figure 8 reference signal patterns and on maintaining low phase shift between the cardioid and figure 8 patterns. Large imperfections in these patterns tend to limit the narrowest available beam width and the attenuation of the back lobe which is that part of the pattern which is below the horizontal axis, as indicated at EB of FIG. 4.

If a whip pattern were used as communication or primary signal instead of the cardioid, for determining the signal to be received, a propeller beam would result from the correlation with a number 8 reference pattern, that is signals from either null of the figure 8 could be received.

With reference to FIGS. 5 to 12 an actually built and successfully tested system of the above described type will now be described, particularly also the correlator circuitry which constitutes a practically very important aspect of the invention, and which is successfully employed in other embodiments also to be described.

In FIG. 5, A5 is a fixed whip antenna, and B5 is a fixed cross loop antenna system with individual loops B5.1, B5.2. A successful practical model incorporates two loops which are identical in construction and are mounted in quadrature on a rotatable platform which latter however, is necessary only if a resolver is not used.

Each loop has an effective height of 21 mm. at 20 kc. at an inductance of approximately 5 millihenrys. The quadrature between loops is maintained so that mutual coupling is quite low, in the order of —70 to —80 db. Both loops are shielded from electrostatic pickup. Each loop antenna feeds directly into an amplifier with a pentode input stage and a dual triode connected in totempole fashion to provide a low output impedance. A Darlington connected transistor emitter follower is incorporated in the cathode circuit of the output stage. Feedback assures low output impedance and favorably constant gain and phase characteristics. These amplifiers are indicated at 1 and 2 of FIG. 5.

In this model, the whip antenna A5 is about 275 cm. in height and directly coupled to the input stage of an amplifier 3 in which the output load impedance appears between the negative end of the plate supply and the cathode of the amplifier tube with the signal voltage applied between the grid and the cathode. This is the well known "bootstrap" circuit, wherein the input signal is applied between grid and cathode. Low gain operation of this amplifier maximizes input impedance and minimizes loading of the antenna output. The output stage operates with a dual triode type 7308 tube in totempole fashion to match a 100 ohm load, and feedback is provided for gain and phase stability.

It will be understood that the above described amplifier constructions are standard equipment, commercially readily available and well known in the art as to incorporation in systems of the type herein dealt with. Other circuitry can of course be used but it should be of such high quality that atmospherics are the limiting factors of noise performance.

The amplifier systems 1 and 2 are arranged in close proximity to the fixed crossed loop antenna structure B5, and the amplifier 3 is similarly arranged near to the whip antenna A. As schematically indicated in FIG. 5, the amplifiers are connected to a remote control chassis mounting the remaining components 4 to 61. This chassis can be located at a considerable distance from the antennas and combines all controls necessary to achieve the narrow beam patterned reception according to the invention.

In order to derive a steerable figure 8 pattern from the fixed loop antenna system utilized in the present embodiment the outputs of the crossed loops are combined in a resolver 7 after having been balanced by Darlington connected emitter followers 4 and 5. The resolver 7 is of conventional design and has a stator 8 with windings 8.1 and 8.2, and a rotor 9 with coils 9.1 and 9.2. The output of the resolver rotor is as follows.

With $\phi$ the angle of incidence of the signal to be received from S, with reference to an arbitrary such as north, south reference line (compare FIG. 1), with $\theta$ the phase angle within the reception pattern, and with $\rho$ the angle between resolver stator and rotor (FIG. 5a) the following relations prevail.

If one loop output is $E_{L1}=K'$ sine $\omega t$ cos $\phi$ then the output of the quadrature loop output is $E_{L2}=K''$ sine $\omega t$ sine $\phi$. $K'$, $K''$ are constants. The two loop outputs combined in the resolver rotor take the form $K'$ sine $\omega t$ cos $\phi$ cos $\rho + K''$ sine $\omega t$ sine $\phi$ sine $\rho$. With $K'=K''$ which can easily be obtained in conventional resolvers, the resultant rotor output becomes $E_r=K$ sine $\omega t$ [cos $(\phi-\rho)$]. Maximums ocur when $\phi-\rho$ is zero or $\pi$, and minimums will occur when $\phi-\rho$ is $\pi/2$ or $3\pi/2$. This is a steerable figure 8 pattern and the resolver rotor can be so adjusted that the stator output becomes a maximum when the loop antenna is effectively aimed at the sender.

The omniazimuthal whip antenna pattern can be expressed as $E_w=K'''$ sine $(\omega t+\gamma)$. In this formula $\gamma$ is the phase difference between the direction of optimal whip reception and loop reception at an arbitrary loop position.

As explained above with reference to FIGS. 3 and 4, the outputs of a loop antenna and of a whip antenna are used to furnish a cardioid pattern such as by means of a summer 20, and the cardioid is further combined with loop signals to obtain a small angle beam pattern as final receiver output signal.

Referring first to the summation at 20, of the whip antenna output and the oriented (aimed) loop antenna pattern, having in mind the above expressions for $E_r$ and $E_w$, and with the loop adjusted in such a manner that the loop output $E_r$ is optimal, $\gamma$ becomes zero. Further with constants $K'''=K''=K'$, linear addition of the outputs of whip and resolver results in $E_c=K$ sine $\omega t$ $[1+\cos (\phi-\rho)]$. This is a cardioid pattern with maximums at $\phi-\rho=0, 2\pi, \ldots$, and minimums at $$\phi-\rho=\pi, 3\pi, \ldots$$

The reception patterns to which the intermediate signals conform at various significant points of the circuit are indicated at these points.

In the embodiment according to FIG. 5, the summing circuitry 20 is preceded by a phase shifting integrating network 11 which is fed from terminal 10.1 of the resolver rotor 9, through a conventional isolating emitter follower stage 11.1. The summing component 20 is connected to the whip antenna through a phase shifting differentiating network 12 and through an emitter follower 6 which corresponds and is similar to, the above described emitter follower blocks 4 and 5 of the loop antenna outputs, providing level adjustment.

The combined effect of integrator 11 and differentiator 12 matches the phases and amplitudes of the whip and loop signals from A5 and B5.1 respectively, over a wide frequency range, which is desirable for obtaining a properly shaped broad band cardioid pattern. It will be evident that phase shifting is necessary because the whip and loop signals are 90° out-of-phase, the loop being responsive to a magnetic wave field and the whip to an electrostatic wave field. Accordingly, the loop signal has to be phase-modified in an integrating current circuit and the whip output is a differentiating potential circuit. Both are conventional RC circuits wherein the phase can be adjusted by adjustment of R or C. It will be understood that the integrator output terminals are across the capacitance and in the differentiator they are across the resistance. The summing or adding component 20 is a resistor network of conventional design of the type indicated in FIG. 6. For all three circuits 11, 12, 20 compare for example "Reference Data for Radio Engineers," fourth edition, 1956, International Telephone and Telegraph Company, page 458, as applied to transistor circuitry.

As outlined above with reference to FIG. 4, in accordance with a preferred embodiment of the invention the circuitry compounded cardioid patterned communication signal from 20 is combined, in a correlator circuit 30 with a figure 8 circuit directly derived from a loop antenna component. This circuit component will now be described.

For purposes of the correlator circuitry, the 10.2 output of the resolver rotor 9 is amplified in an isolating emitter follower 14.1 which is identical with the component 11.1 on the 10.1 loop antenna output. This signal then undergoes a phase shift at 14 by means of integrating circuitry similar to that described above with reference to component 11. Optimal for proper correlator operation is a ratio of 10 to 1 between reference (figure 8) signal and communication (cardioid) signal and the necessary additional gain for the former is provided by the amplifier 21 which is preferably of the above mentioned emitter follower type.

Following the adder 20 and the amplifier 21, the cardioid receiver signal circuit and the figure 8 reference signal circuit, respectively, contain similar components as follows. Blocks 20 and 21 are each followed by a series tuned circuit 22, 23 and an emitter follower circuit 24, 25 respectively; these are followed by gain controls 26, 27 respectively; these again are followed by identical amplifiers 28, 29 respectively, each of which is composed of three stages of triode amplification. This provides the gain required to overcome the minimum operating levels for the following signal combining correlator, without degrading the system's basic sensitivities or phase characteristics.

The amplifiers 28, 29 feed into the correlator circuit 30 which will be described in detail herein below with reference to FIGS. 7 to 9, which illustrate circuits of this type in general, and also with specific reference to FIG. 10 which shows circuitry that is preferably used in embodiments according to FIG. 5.

As described above with reference to FIG. 4, the output of correlator 30 is further combined, at 40, with a reference signal derived from the first reference signal by phase conversion. Since the output of correlator 30 conforms to a directional pattern which is unsymmetrical, and its output wave is therefore not cleanly sinusoidal, correction is applied to this signal at 51 by means of a conventional tuning circuit with emitter followers, before being applied to the second correlator 40. The reference signal is tapped from between 29 and 30, attenuated, returned and phase inverted at 50, to establish correct phase and gain relationship with the input from 51.

The narrow beam output pattern of correlator 40 is improved by reducing its harmonic content by means of an emitter follower with tuned circuit 53. An output level control 54 is also provided at this point to preclude overloading of any receiver which may be used with the present system. The small angle patterned final output signal is then passed through a selector switch 60 with terminal O to an output driver 61 which preferably consists in this embodiment of an emitter follower and transformer combination of conventional design, providing at $E_{05}$ up to 1.5 volts undistorted into a 50 ohm load. This represents the desired narrow directional receiving range.

FIG. 5 also indicates, at 15, a conventional adding circuit similar to that shown at 20 and in FIG. 6, which furnishes an omniazimuthal output derived from the resolver 7 by way of the two integrating circuits 11 and 14, above described, and available at 60. This circuit, by additively combining the output signals of the quadrature loops B5, furnishes a purely circular broad band, and omniazimuthal but (as distinct from the omniazimuthal output of the whip antenna A5) phase oriented pattern. This phase orientation varies with the directions of the incoming signal, and can be steered at will by rotating the resolver 7 or by jointly rotating the loops. The pattern diagram shown adjacent to block 15 of FIG. 5 indicates this operation. The pattern being derived from a loop system, this feature is convenient particularly in the presence of interference of an electrostatic nature.

To the output selector switch 60 there can also be connected at a, c, d direct leads to output terminals a1, c1, d1 of the whip antenna and of the crossed loop antennas respectively, as indicated in FIG. 5.

The receiver above described with reference to FIG. 5 thus provides at the selector switch the following outputs:

(1) An amplified whip output from a1,
(2) A steerable figure 8 output from c1,
(3) A steerable cardioid output from d1,
(4) A steerable phase oriented omniazimuthal output derived from component 15 at f; and
(5) The steerable narrow angle output $P_{r5}$ at o through 61 and $E_{05}$.

Between the tuned emitter follower circuit 24 and the gain control circuit 26 of the cardioid communication signal circuit there is preferably inserted an interference rejection or nulling circuit which is indicated in dot and dash lines at 70 and which will be described more in detail herein below with reference to FIGS. 11 and 12.

As pointed out above, circuitry for combining wide angle patterns of suitable different configurations (such as a cardioid patterned communication signal and a figure 8 patterned reference signals), are of primary importance in systems according to the invention.

As distinct from the problem of simply adding amplitudes which conform to distinct selected antenna reception patterns without regard to the pattern width (such as in blocks S of FIG. 3, and 20 of FIGS. 4 and 5), the input signal combination for purposes of obtaining a simulated "small angle beam" ouput signal (such as in block N of FIGS. 2 and 3, and blocks 30 and 40 of FIGS. 4 and 5) involves the problem of rejecting all input signals which do not conform to a particular relation between the polar coordinates (related to a common direction of optimal reception) of two distinct wide angle reception patterns (such as cardioid and figure 8 reception patterns) to which these signals conform. For example, an output from block N of FIG. 2 should be obtained only when the amplitude and phase of a signal conforming to a wide angle beam pattern match the amplitude and phase of a cardioid pattern.

It was found that linear systems such as feedback circuits are not very well suited for the above purpose. Non-linear circuitry is better suited and most troublesome unlinearities can largely be compensated for, as will appear herein below. The pattern combining device (herein for short referred to as "correlator" without intending a mathematical connotation) based on phase detector or synchronous switching circuitry which is preferred at this time will be described with reference to FIGS. 8 to 10.

This phase dependent switching circuitry can be characterized as passing an intended "communication" or intelligence signal unhampered in the absence of a "reference" or control signal. It furnishes a sine wave output signal whose amplitude after filtering is approximately a function $\cos(\psi/2)$ where $\psi$ is the phase difference between communication and control signals, as indicated in FIG. 1. The output amplitude is the same as the communication signal amplitude when the latter is in phase with the control signal, whereas, when communication and control inputs are 180° out-of-phase, no output (or a high attenuated output) amplitude is obtained.

Referring more specifically to systems according to FIGS. 3 to 5, it will be remembered that the cardioid generating network 20 with its cooperating linear summing networks together with phase correction and amplification circuitry furnish a cardioid pattern signal with a single null in the back lobe direction of the loop or dipole antenna B5.1 and which is in quadrature with B5.2. The resultant cardioidal patterned signal retains, with the quadrature figure 8, the capability of being steered by the directional antenna B5.7. The cardioid is the communication signal which is correlated with the figure 8 control signal in quadrature to the cardioid patterned signal. Since the resolver steering structure rotates the cardioid and figure 8 patterns synchronously, the simulated orientation of the pattern of the final narrow beam is similarly controlled. Signals of maximum amplitude conforming to the cardioid pattern are passed unattenuated through the correlator circuit due to the absence of a reference signal at the figure 8 null pattern angle. Signals conforming to the lefthand side of the positively phased cardioid pattern are not passed through the first correlator due to their 180° phase relationship with the control input at 20, whereas the signals conforming to the righthand side of the cardioid pattern which passed through the correlator 30, are not passed through the second correlator 40 because they are 180° out-of-phase with the control pattern which is of opposite phase in the second detector. Reception from the back direction, that is the direction opposite the sender direction s, is limited by the cardioid configuration of the input.

A preferred correlator system such as used at 30 and 40 of FIG. 5, will now be described with reference to FIGS. 7 to 9. In FIGURE 7 numerals J1, J2, J3, J4 denote the junction points of the branches of a bridge network at diagonally opposite points of that network. D1, D2, D3 and D4 are diodes, one in each branch of the bridge network, or generally speaking devices with prevalent conductivity in the same direction around the branches of the bridge. D5 and D6 denote diodes connected in series between the second pair of opposite junction points, namely J3 and J4. The cardioid patterned communication signal is supplied at the signal input $S_c$ at a center tap of the secondary of a low impedance transformer T connected across the first pair of opposite junction points J1 and J2. The figure 8 reference input is to the terminals $S_r$ of the transformer primary. The output terminals $S_o$ is connected to a point between the two diodes D5 and D6 which are in series connected across the second pair of junctions J3 and J4. In this circuit wherein a communication signal is to be improved by a reference input, the latter must necessarily not contribute to the output comunication signal.

The operation of this correlator will now be explained more in detail with reference to FIGS. 8 and 9, it being assumed for that purpose that suitable nearly ideal cardioid and figure 8 signals, respectively, are available, resulting in an ideally narrow patterned amplitude conforming to a directional output beam. Generally speaking, a large positive reference input at $S_r$ switches the communication signal at $S_c$ to the anode of D5—a large negative reference input switches the communication input to the cathode of D5—and for a zero reference input the communication signal goes directly to the output using diode conduction through the bridge one way or the other.

The following table presents the operation of the correlator more in detail with reference to FIG. 8 wherein a, b, c, d, e are equivalent circuits into which FIG. 7 can be broken down and which are appropriate to the level and polarity of the reference input. The arrows on the reference input terminals $S_r$ indicate the definition of positive polarity, and the polarity signs (+ and —) indicate the actual polarity that prevails at the assumed condition.

In the table and in the following text, the reference input amplitude is $E_r$, the communication signal input amplitude is $E_s$, and the output is $E_o$. The constants R, S and E are the reference signal, communication signal, and output signal R.M.S. modules, respectively. $\psi$ is the phase difference between the communication signal and the control signal, and $\phi$ is the direction of reception, compare FIG. 1.

| Phase Relationship of $E_s$ and $E_r$ | Voltage Conditions | | Voltages | | | FIG. 9, Diagram |
|---|---|---|---|---|---|---|
| | R,S | sine $\omega t$ | $E_r$ | $E_s$ | $E_{out}$ | |
| | R is zero | | | | | a |
| In Phase | R ≥ 0) S ≥ 0) | $E_r$...pos. $0 \leq t \leq \frac{\pi}{\omega}$ | R sine $\omega t$ | S sine $\omega t$ | | b |
| | | $E_r$...neg. $\frac{\pi}{\omega} \leq t \leq \frac{\pi}{\omega}$ | | | | c |
| In Opposition | R ≥ 0) S ≥ 0) | $E_r$...neg. $0 \leq t \leq \frac{\pi}{\omega}$ | R sine $\omega t$ | S sine $\omega t$ | | a |
| | | $E_r$...pos. $\frac{\pi}{\omega} \leq t \leq \frac{2\pi}{\omega}$ | | | (S + R)· sine $\omega t$ | b |
| | R ≥ S S ≥ 0 | $E_r$... highly pos. or neg. | | | Zero | d or e |
| General | R ≫ S) S ≥ 0) | $E_r$... highly pos. $0 \leq t \leq \frac{\pi}{\omega}$ | R sine $\omega t$ | S sine ($\omega t$ + $\theta'$) | E sine ($\omega t$ + $\phi$) pos. only | d |
| | | $E_r$... highly neg. $\frac{\pi}{\omega} \leq t \leq \frac{2\pi}{\omega}$ | | | E sine ($\omega t$ + $\phi$) neg. only | e |

It will be noted that in all situations, only positive or negative portions of the communication signal pass to the output of the correlator when the reference signal is positive or negative, respectively.

FIG. 9 indicates the output wave forms for positive and negative phase differences. In this figure, the wave form for negative $\phi$ is obtained from the positive $\phi$ by reversing time axis as well as polarity. Having this in mind and assuming that a receiver monitoring the output will be tuned to the fundamental Fourier component, it can be shown that $$E_0 = E \sin(\omega t + \phi) = \sqrt{A_1^2 + B_1^2} \sin\left(\omega t + ctn \frac{-1A_1}{B_1}\right)$$

wherein $A_1$ and $B_1$ are the integral equations $$A_1 = \frac{1}{\pi}\int_0^{2\pi} E_{out} \sin(\omega t) \, d(\omega t)$$

and $$B_1 = \frac{1}{\pi}\int_0^{2\pi} E_{out} \cos(\omega t) d(\omega t)$$

These integral equations can be graphically solved with the aid of the diagrams such as FIG. 9. In this manner the following expressions result for $\psi$ between 0° and 180°:

$$F_{out} = \frac{S}{\pi}\sqrt{(\pi - \Psi)^2 + (\pi - \Psi)\sin e^2 \Psi + \sin e^2 \Psi}$$

and $$\phi = ctn^{-1}\left(ctn\Psi + \frac{1}{\pi - \Psi}\right)$$

By reversing the sign of $\phi$, the same formulas are corrective for negative values of $\psi$ between 0° and −180°.

Polar plots of these computations show that the above described correlator operates optimally with zero attenuation under normal conditions, when the reference is zero or exactly in phase, or when the reference signal is exactly out-of-phase with the communication signal, in which case more and more attenuation is produced as the reference level increases until infinite attenuation results for reference levels exceeding the communication level. Somewhat incomplete reference signal cancellation on the output terminal is an imperfection of practical circuits of this type; however the reference feed-through can be held better than 40 db below the peak communication signal level. Complete reference signal cancellation is achieved only when the diodes D1, D2, D3, D4 of FIG. 8 are perfectly balanced. Variable resistors R1, R2, R3, R4, inserted as indicated in FIG. 7 are of assistance in this respect within a limited dynamic range of the reference signal level which varies with the reception energy.

In a fully operative embodiment, the six diodes are of the Transitron GPD–5 type and the four resistors, when used, are rated in the order of 200 to 2000 ohms. Variable resistors instead of fixed resistors are valuable in this respect, but not over a wide dynamic range or reference level which latter will vary with strength of reception.

The above described correlator system can be considerably improved for operation over a wide frequency band and dynamic range, by replacing the input transformer T of FIG. 7 with the network now to be described with reference to FIG. 10. This network is particularly useful in combination with systems according to FIGS. 4 and 5. In FIG. 10, 35 is a correlator corresponding to FIG. 7, but without transformer T. The input of FIG. 7 is here modified as follows.

The reference signal from 29 is fed to the control element of a paraphase amplifier 31 of conventional construction, which feeds into conventional swimming circuits 32, 33 similar as at 11.5 of FIG. 6. The control signal input is at a connection between the other summer inputs similar as at 12.5 of the FIG. 6 summer. The summers 32, 33 feed, such as at 22.5 of the FIG. 6 summer, into two emitter follower circuits 34, 36 which in their turn feed into the correlator 35 at junctions J1 and J2, respectively. As in FIG. 7, the output is derived at $m$ between diodes D5 and D6, and feeds to block 51 or 53. With circuitry of this type, a correlator balance of greater than 60 db is realized.

As previously mentioned, the practically unavoidable non-linear operation of the otherwise very advantageous correlator circuitry according to FIGS. 7 to 10 has the disadvantage of the possible intermodulation between the signal to be received and aimed into by the directional antenna of the system, and signals from other directions. This can be minimized by making the correlator inputs highly frequency selective so that only signals very near the desired receiver frequency can intermodulate. Since it can be assumed that this interfering noise is random and of short duration, its detrimental effect on keyed continuous wave, or frequency keyed reception can be tolerated for most practical purposes. However, if such a problem should arise (caused for example by frequency or continuous wave jamming signals quite near the own frequency but outside the own beam) the undesirable signals can be nulled out by combining, with ciruitry according to the invention, the tentative auxiliary network which is indicated at 70 of FIG. 5 and which will be referred to as "interference rejector." Its general principle will first be explained with reference to FIG. 11, and a specific circuit especially suited for combining with systems according to FIG. 5, will then be described with reference to FIG. 12.

It will now be evident that the cardioid patterned signal in the path from the adder 20 to the correlator 30 (FIGS. 4 and 5) is affected by the interference signals, if any are present, such as not to conform to the ideal cardioid pattern. Further, it will be remembered that, for optimal reception, the receiver is adjusted by rotating the resolver rotor and hence the resolver output at 10.1 and with it the cardioid pattern such that maximum amplitude reception is attained, which eliminates signals from the back direction. It will further be remembered that two signals conforming to a figure 8 pattern are present in the circuitry, reversed 180° in phase from each other, and with the null direction of the reference signal figure 8 pattern from 10.2 likewise pointing, virtually, towards the sender, since both cardioid and figure 8 are derived from the loops and the resolver. These figure 8 patterns of opposite phase appear on either side of the phase inverter 50 (FIGS. 4 and 5) between correlators 30 and 40. As schematically indicated in FIG. 11 where block 71 denotes a conventional adding circuit similar to that described above with reference to FIG. 6, these phase reversed figure 8 control signals are applied to the respective sides of a midpoint grounded potentiometer 72. If the adjustable takeoff 74 of a potentiometer is on the zero tap 73 of 72, the two figure 8 patterns will cancel each other, and the cardioids on either side of 71 will be essentially similar. If, however, 74 is moved to one side or the other, more or less of one or the other figure 8 signals is applied to the adder 71. In FIG. 11, the two cardioid patterns are indicated in full lines for normal reception without interference and with 74 at the center tap 73. The dotted line cardioid indicates distortion of the figure 8 pattern by interference, or off-center position of 74 without interference. Thus, the two opposite phase figure 8 patterns of the reference signal can be added to the cardioid to cancel jamming signals from any one direction. The corrected patterns approximates a cardioid pattern with two nulls, one fixed and one steerable throughout most of 360°. Since the inputs to the respective ends of the potentiometer 72, coming from 10.2, do not contain the communication signal from the direction of the sender towards which the loops are aimed, the amount of added 180° out-of-phase figure 8 to the cardioid pattern can be adjusted until any single interference is canceled out, without affecting the amplitude of the desired signal. The resulting modified cardioid pattern is somewhat odd shaped, representing the conformity thereto of signal amplitudes from various spatial angles of such a polar diagram, but this does not affect the usefulness of the arrangement as an effective means to eliminate jamming signals.

FIG. 12 illustrates the application of the basic interference eliminating circuitry according to FIG. 11, to the practical embodiment shown in FIG. 5. It will be noted that for the present purpose the adder 71 is inserted between emitter follower 24 and gain control 26, and connected to the adjustable potentiometer contact 74 by means of a switch 77 which permits its effective elimination, since this adding circuit will not affect the cardioid signal running from 24 to 26 of FIG. 5, if the input of 71 is disconnected.

The figure 8 signals of opposing phase are here supplied from cathode followers 75, 76 which again are connected to the paraphase amplifier 31 of FIG. 10. For the sake of better correlation with FIGS. 5 and 10, several blocks of these figures are repeated in FIG. 12, but need no further description.

Several modifications of the invention will now be described with reference to FIGS. 13 to 15. These modifications are based on the principles explained with reference to FIGS. 1 to 6 so that it is only necessary to describe the correlation and cooperation of their various components, each of which has been individually described in detail herein above. Each of these modifications includes correlators such as specifically described with reference to FIGS. 7 to 9.

The modification shown in FIG. 13 employs a whip antenna A6 and a single loop antenna B6, which feed into conventional low noise vacuum tube amplifiers 101, 102, respectively, preferably of the type described above with reference to blocks 1 and 2 of FIG. 5. Instead of the loop antenna B6, an Adcock antenna system could be used, but it was found that a loop antenna is preferable because it obtains a difference output equivalent to that of an Adcock antenna at lower impedance, and because signal power can be added by increasing loop turns. A 1 by 1 meter loop is adequate at all frequencies from 2 to 200 kc. At 2 kc., the sensitivity of the loop and of the associated broad band pre-amplifier 102 is about 20 microvolt per meter at a 1 kc. band width.

As schematically indicated at 106 of FIG. 13, the whip and loop antenna structures can be mounted on a rotatable platform side by side, to provide the possibilities of steering them in a simple and inexpensive manner and also of checking the sine patterns if desirable. Such a mechanically steerable system is less expensive than the electronically steerable system of FIG. 5 employing at least two loops in quadrature with a resolver. The omniazimuthally patterned primary or communication signal from A6 and the figure 8 patterned reference signal of the polarity indicated, are fed into an adder 120. The omniazimuthal whip signal is phase-inverted at 122 and fed, together with the above-mentioned figure 8 patterned loop signal, to a second adder 123. The adder 121 and 123 have cardioid patterned output signals of opposite phase, as indicated. These two wide angle patterned signals are fed into a correlator 130 which, in accordance with the principles above explained with reference to FIGS. 7 to 9, furnish and output signal $E_{o6}$ which conforms to (simulates) a narrow angle beam $P_{r6}$ which is steerable with the antennas as explained above. It will be noted that this circuit up to and including the adders or summing amplifiers 121, 123 has a close resemblance to the circuitry according to FIG. 3, from which the correlation of two cardioid patterns of opposite phase however is a departure.

This is essentially a broad band circuit, but as indicated in FIG. 13 with dashed lines, three tuning tracking filters 141, 142 and 143 can be added for narrowing the band width, such as to 50 cps. These filters are adjustable by means of a common drive 145. They are of conventional design but care must be taken that 141 and 142 are capable of tuning over the entire frequency range desired, and of tracking very accurately in phase.

A further modification is illustrated in FIG. 14. Similarly to the system according to FIG. 4 this receiver utilizes a whip antenna A7 and a quadrature loop antenna B7. The cross loop antenna is mounted on a turntable 107 which feeds into a resolver 7 similar in design to that described with reference to FIG. 5 and including a rotor 109 which, by means of an adder 115 similar to component 15 described with reference to FIG. 5, delivers a phase steerable ominazimuthal pattern in the fashion also explained above with reference to FIG. 5, and similarly indicated in FIG. 14. Two correlators 131, 132 of the type described with reference to FIG. 7 are provided, both of which receive as communication signals the output of the whip A7. The correlator 131 receives as a reference signal the phase variable, omniazimuthally patterned signal from the cross loop antenna B7 and the adder 115. The output of 131 is a cardioid pattern whose null occurs in the direction of the signal that is aimed at and whose phase coincides with that of the signals received by omniazimuthal whip A7. At 123 this cardioid output is phase-shifted as indicated, and applied as a reference signal to correlator 132. It will now be understood from the above explanation of FIGS. 7 to 9 that 132 has an output only when signals arrive from the direction where the reference signal is a minimum, whereas signals coming from all other directions and 180° out-of-phase with the reference signal are attenuated. The output $E_{o7}$ of 132 is therefore a narrow angle beam $P_{r7}$ rotatable by way of the phase steerable omniazimuthal pattern supplied by the antenna B7. The beam width of $E_{o7}$ however is approximately twice that of the systems using figure 8 null control beams which have so far been described. This is due to the fact that the reference signals which control the correlators 131, 132 are $(sine)^{1/2}$ functions while in the previously described circuitry the reference signals are sine functions. The square root sine is less sensitive to noise bursts and jamming coming from several directions simultaneously because the same phase information is fed to both, communication signal and reference signal, inputs to the correlators 131, 132. In a system controlled by sine reference signals, the reference signal phase stems from a figure 8 input and the communication signal phase stems from a cardioid patterned input. It will now be understood that two separate out-of-phase cardioid and figure 8 patterned signals can be made to combine to a resultant signal of different phase, but that whip patterned and generated square root cardioides cannot be combined in that fashion.

The modification according to FIG. 14 is rather similar to the circuitry according to FIG. 2, and these two systems together demonstrate the general principle of the present invention as described with reference to FIG. 2.

While the previously described receivers operate with correlator circuitry in series, the modification now to be described employs two correlators connected in parallel.

In FIG. 15 the receiver has a whip antenna A8 and a crossed loop antenna B8 connected to a resolver 107, as described with reference to FIGS. 5 and 14. The omniazimuthally patterned whip antenna output and one of the figure 8 patterned signals from one resolver coil are fed to an adder 125 which furnish the indicated cardioid patterned output representing the communication signal. This and the figure 8 patterned reference signal output of the second resolver rotor are fed to the correlator 133. The quadrature figure 8 patterned reference signal is phase-inverted at 124 and with the cardioid patterned communication signal from the adder 125 supplied to a second correlator 134. The outputs of correlators 133 and 134 are mirror image half-beam half-cardioid patterned, as described above with reference to EH of FIG. 4, and as indicated in FIG. 15. These signals are added at 126 to form a pear patterned output signal EP which is fed to a third adder 127 together with a cardioid derived from 125 and phase-inverted at 128. The pear patterned signal EP and the phase inverted cardioid 128 together form at the output $E_{o8}$ a steerable beam patterned final output beam $P_{r8}$.

Parallel correlator circuitry of this type reduces intermodulation due to the peculiar symmetrically patterned intermediate signals and also produces a more symmetrical final output beam, also due to the symmetry of the intermediate signal patterns.

The operation of devices according to the invention is, as intended, very simple. Referring for example to the complete receiver according to FIG. 5, a desired reception pattern is selected at 60, for example a narrow beam $E_{o5}$. The various tuned circuits are then set to the selected sender wavelength, and the gain levels adjusted. If the noise eliminator 70 according to FIGS. 11 and 12 is used, its control is adjusted for optimal reception. The resolver is simultaneously set to accomplish virtual training of the crossed loops at the sender to which the receiver is tuned. These are the only manual steps required but it will be understood that the resolver rotor has to be continuously adjusted to maintain the virtual aim at the sender, if either sender or receiver or both are moving.

As mentioned above with reference to FIG. 5, the antennas with their preamplifiers are separate units and all control instrumentalities can be arranged remotely thereof on a unitary chassis.

It should be understood that the present disclosure is for the purpose of illustration only and that this invention includes all modifications and equivalents which fall within the scope of the appended claims.

We claim:
1. A receiving system for selecting from omniazimuthally impinging energy a directional, azimuthally narrow angle receiving range, comprising:
   means for collecting from said energy two signals conforming, with broad beam reception patterns in a given angular relation, to dissimilar power distribution within the broad beam reception patterns thereof, respectively, the amplitudes of said broad beam signals being different in an orientation dependent upon the direction of said narrow receiving range; and
   means for combining said two dissimilar patterned signals by attenuating reception pattern portions which are outside of said narrow receiving range to form a system output signal containing within said narrow receiving range pattern portions of at least one of said signals, conforming to a narrow beam pattern having maximal amplitude in said narrow directional receiving range to the appreciable exclusion of energy impinging from outside said range.

2. System according to claim 1, wherein one broad beam patterned signal has in said orientation an appreciable amplitude while the amplitude of the second broad beam patterned signal has a minimum in said orientation.

3. System according to claim 1 wherein said combining means include:
   impedance means having end terminal means and intermediate tap means, one of said signals being supplied to said end terminal means and the other signal being supplied to said tap means, and
   a bridge network having four branches and connected with two opposite junctions across said end terminal means, having a connection with a signal output terminal across the two other junctions, and having six rectifier means one in each branch and two in said output connection one on each side of the output terminal.

4. System according to claim 1 wherein said collecting means includes:
   first antenna means for delivering in said orientation a wide angle patterned output signal of appreciable power amplitude in the impinging direction, and
   second antenna means for delivering a wide angle output signal patterned dissimilarly from said first collector output signal and having for an angular region determined by said orientation as dependent from said narrow directional receiving range an amplitude appreciably different from the output amplitude at angles outside said region.

5. System according to claim 4 wherein said first antenna means is an antenna of linear structure having an effectively circular reception pattern.

6. System according to claim 4 wherein said second antenna means is an antenna of non-linear structure having a non-circular output pattern which is effectively symmetrical to said orientation.

7. System according to claim 6 wherein said correlating means includes:
   means for generating from said non-circular patterned antenna output a first, phase steerable, wave signal conforming to directional beam pattern oriented by said range,
   a cardioid generator for combining said output signal of said first antenna means and said first signal to form a second wave signal of cardioid configuration with its minimal amplitude portion oriented by said narrow directional receiving range,
   means for deriving from said first signal a third signal patterned similar to said first signal but of opposite phase, and
   a correlator supplied with said second and third signals for generating a wave signal of half cardioid configuration.

8. System according to claim 7 wherein said correlator includes:
   a bridge network having four branches with two pair of branch junctions at diagonally opposite points of the network;
   first input means connected to said cardioid generator and including impedance dividing means connected to a first pair of opposite junction points and having a point of intermediate potential which is supplied with said first wave signal;
   four diode means in each branch of the bridge network with prevalent conductivity in the same direction around the branches of the bridge;
   two diode means connected in series between the second pair of opposite junction points with prevalent conductivity in the same direction;
   and an output terminal between said series connected diodes.

9. System according to claim 6 wherein said correlating means includes:
   means for generating from said non-circular patterned antenna output first and second, phase steerable, wave signals of quadrature phases conforming to directional beam patterns oriented by said range, respectively,
   a cardioid generator for combining said output signal of said first antenna means and said first signal to form a third wave signal of cardioid configuration with its minimal amplitude portion oriented by said narrow directional receiving range;
   a first correlator supplied with said second and third signals to generate a fourth wave signal of half beam-half cardioid configuration,
   means for inverting the phase of said second signal to generate a fifth wave signal, and
   a second correlator supplied with said fourth and fifth signals for generating a narrow beam output wave signal.

10. System according to claim 9 wherein said second antenna means has two crossed components with an output pattern having two crossed double lobes in quadrature, and which receiver further comprises resolver means connected to said two crossed components and having trainable rotor means for developing two separate double lobe signals in quadrature constituting said first and second wave signals.

11. System according to claim 9, further comprising:
a potential divider connected across said inverting means and having an adjustable tap;
wave energy summing means connected between said cardioid generator and said first correlator and having differential means with a terminal connected to said tap; and
means for adjusting the potential of said tap for adding predetermined asymmetrically different amounts of said fourth signal to said third signal thereby rotating the pattern of the output signal.

12. System according to claim 4 wherein said correlating means include:
a first cardioid generator for combining said output signals of said first and second antenna means to form a first wave signal of cardioid configuration with its minimal amplitude portion oriented by said narrow directional receiving range,
means for deriving from said first antenna output signal a second wave signal patterned similar to said first wave signal but of opposite phase,
a second cardioid generator for combining said second antenna output signal with said second wave signal to form a third wave signal of cardioid configuration oriented in opposition to that of said first wave signal; and
a correlator supplied with said first and third wave signals for generating an output wave signal conforming to a beam that is narrower than said output patterns of the first and second antenna means.

13. System according to claim 12 further including adjustable wave filter means inserted between said first and second cardioid generators and said correlator, respectively, and in the output of said correlator.

14. System according to claim 4 wherein said correlating means include:
means for generating from said second antenna output signal a first, phase steerable, wave signal conforming to a circular pattern phase oriented by said range,
a first correlator supplied with said first antenna output signal and said first wave signal to form a second wave signal conforming to a cardioid pattern of the phase of said first wave signal,
means for deriving from said second wave signal a third wave signal patterned similar to said first wave signal but of opposite phase, and
a second correlator supplied with said first antenna output signal and said third wave signal to form a narrow beam output wave signal.

15. System according to claim 4 wherein said correlating means include:
means for generating from said second antenna output signal first and second wave signals of quadrature phase conforming to directional beam patterns oriented by said range, respectively,
a first cardioid generator for combining said first antenna signal and said first wave signal to form a third wave signal of cardioid configuration phase oriented similar to said first wave signal;
means for deriving from said second wave signal a fourth wave signal patterned similar to said second wave signal but of opposite phase,
a first correlator supplied with said second and third wave signals to form a fifth, semibeam-semicardioid, wave signal,
a second correlator parallel to said first correlator supplied with said third and fourth wave signals to form a sixth, semicardioid-semibeam patterned wave signal,
means for generating from said fifth and sixth wave signals a seventh pear-shape patterned wave signal,
means for deriving from said third wave signal an eighth wave signal patterned similar to said third wave signal but of opposite phase, and
means for generating from said seventh and eighth wave signals a narrow beam output wave signal.

16. A wave energy receiver for selecting from omniazimuthally impinging energy an azimuthally narrow receiving range in a given direction, comprising:
omniazimuthal antenna means for delivering a first signal the amplitude of which conforms to a pattern uniformly responsive to wave energy from all directions;
broad beam directional antenna means trainable in said given direction for delivering a second signal the amplitude of which conforms to a directional wave energy pattern oriented in said given direction, and for delivering a third signal the amplitude of which conforms to a directional wave energy pattern similar to but in quadrature with that of said second signal;
means for combining said first and second signals for delivering a fourth signal the amplitude of which conforms to a cardioid-pattern oriented in said given direction;
means for modifying said third signal to furnish a fifth signal which conforms to the pattern of but is oppositely phased to said third signal; and
means for combining said fourth and fifth signals to furnish and output signal the amplitude of which conforms to a wave energy beam pattern in said given direction and narrower than the pattern of said broad beam signal to be detected.

17. Receiver according to claim 16 wherein said combining means includes:
a first correlator supplied with said fourth and fifth wave signals to generate a sixth half beam- half cardioid wave patterned signal,
means for modifying said fifth wave signal to furnish a seventh signal which conforms to the pattern of but is oppositely phased to said fifth signal, and
a second correlator supplied with said sixth and seventh signals to generate and output wave signal conforming to a narrow essentially symmetrical beam pattern.

18. A device for selecting from a communication signal having a broad beam reception pattern a narrow communication beam in a given direction within the broad beam, with the aid of a control signal having a broad beam reception pattern essentially codirectional with said communication beam but of predeterminedly dissimilar power distribution, comprising:
means for superimposing said communication and control signals;
directional switching means supplied with said superimposed signals for eliminating, from said broad communication signal pattern portions in coincidental phase relation to portions of said broad control signal pattern; and
means for deriving from said switching means the resulting narrow beam of non-coincidental portions of the communication signal.

19. Device according to claim 18 wherein said communication beam is cardioid patterned and said control beam is codirectionally figure 8 patterned.

20. Apparatus for correlating two energy waves conforming to different wide beam reception patterns, comprising:
a bridge network having four branches with two pairs of branch junctions at diagonally opposite points of the network;
first wave input means including impedance dividing means connected to a first pair of opposite junction points and haivng a point of intermediate potential;
second wave input means connected to said point of intermediate potential;
four diode means one in each branch of the bridge network with prevalent conductivity in the same direction around the branches of the bridge;

two diode means connected in series between the second pair of opposite junction points with prevalent conductivity in the same direction;

and an output terminal between said series connected diodes.

21. Apparatus according to claim 18 further comprising four resistor means, one in series with each one of said four diode means.

22. In an energy receiving system for deriving from broad beam collector means a narrow beam output signal, an interference rejecting device comprising:

means for inverting the phase of a directionally patterned first signal having a first and a second terminal means carrying the original and the phase inverted signals, respectively, having a potential divider across said first and second terminal means, and having an adjustable tap;

a line for a second directionally patterned signal;

wave energy summing means having two terminals connected in said line and a third balancing terminal connected to said tap; and means for adjusting the potential of said tap for adding predetermined asymmetrically different amounts of said first signal to said second signal thereby rotating the pattern of the second signal.

23. Interference rejecting device according to claim 21 wherein said first signal is figure 8 patterned and said second signal is cardioid patterned.

References Cited

UNITED STATES PATENTS

| | | |
|---|---|---|
| 2,061,737 | 11/1936 | Offenhauser. |
| 3,107,351 | 10/1963 | Milan. |
| 3,290,684 | 12/1966 | Renn et al. |

RODNEY D. BENNETT, *Primary Examiner.*

R. E. BERGER, *Assistant Examiner.*